United States Patent [19]

Gassmann

[11] Patent Number: 4,638,171

[45] Date of Patent: Jan. 20, 1987

[54] METHOD AND DEVICE FOR THE DETECTION OF THE POSITION OF OBJECTS STACKED ON PALLETS

[75] Inventor: Max Gassmann, l'Etang la Ville, France

[73] Assignee: L'Oreal, Paris, France

[21] Appl. No.: 590,761

[22] Filed: Mar. 19, 1984

[30] Foreign Application Priority Data

Mar. 25, 1983 [FR] France ................................. 83 04992

[51] Int. Cl.[4] .............................................. G06K 7/10
[52] U.S. Cl. ..................................... 250/566; 235/461
[58] Field of Search ............... 250/560, 561, 566, 568; 235/461, 462–467; 356/1, 4

[56] References Cited

U.S. PATENT DOCUMENTS 4,029,415 6/1977 Johnson ................................... 356/4
4,556,313 12/1985 Miller, Jr. et al. ...................... 356/1

*Primary Examiner*—David C. Nelms
*Assistant Examiner*—L. W. Madoo
*Attorney, Agent, or Firm*—Horst M. Kasper

[57] ABSTRACT

The position of parallelepiped-shaped objects on a first receptacle is detected by means of a detection device using an optical reader operating on a position mark carrier which has two label portions intended to arise on different ones of two adjacent sides of the object, one of the sides being larger than the other. Each of the label portions has a respective identification mark so that not only does the label indicate the nature of the object, it also identifies which of the two adjacent faces of the object is being scanned by the optical reader. Furthermore, means are provided for measuring the distance of the optical reader from the scanned side of the object, by relying on angular deflection of a scanning beam at a given constant angular velocity and measurement of the time taken to scan the label portion which has a predetermined constant length. The position mark carrier has two label portions each of which bears the same bar code to identify the object and additional markings in association with the bar code for identifying the particular label portion, and hence the particular face of the object, which is being scanned. The apparatus is capable of scanning horizontally to discover the position of the nearest set of objects on a first receptacle, and then repeating that horizontal scan to process the next adjacent objects, and so on until the top layer has been removed. Then the scanner is indexed downwardly through a distance equivalent to the height common to the objects, and the process on the next uppermost layer is repeated, and so on until all of the objects have been removed from the first receptacle.

20 Claims, 5 Drawing Figures

METHOD AND DEVICE FOR THE DETECTION OF THE POSITION OF OBJECTS STACKED ON PALLETS

FIELD OF THE INVENTION

The present invention concerns a method and a device for the detection of the position of objects stored on receptacles. The invention relates more particularly to the detection of the position of identical parallelepiped-shaped objects on stacking receptacles, these objects being intended to be transferred by an automatic device from the first receptacle (or receptacles) whereon they are stored onto at least one other receptacle, possibly one having different dimensions, the other receptacle being one whereon different objects have to be disposed and/or assorted in a different manner.

PRIOR ART

It is known that such methods and devices are used particularly for automating the formation of pallets, each layer of which is constituted by parallelepiped-shaped objects which are mutually identical as regards their external shape and dimensions and preferably also as regards their nature, and are such that the objects of a given layer are different from the objects of the adjacent layer or layers, at least as regards their nature but they preferably have the same shape and the same dimensions from one layer to another. Such pallets are formed by the transfer of objects from homogeneous stacking first receptacles on each of which the objects are identical, not only in each layer but also from one layer to another, as regards their shape, dimensions and nature.

Such devices for the detection of the position of objects on their stacking receptacle are combined with automatic transfer devices such as automatic palletisers, in plants for the preparation of orders on the ground with a view to facilitating the distribution of articles or products from their centres of production or of storage to different sales areas.

In this case, the objects being transferred are most frequently relatively rigid parallelepiped-shaped packing cartons, for instance of cardboard, wherein one or several articles are packed. Automatic palletisers for transferring such objects from one receptacle to another take the form of mobile robots intended for displacement along the homogeneous stacking receptacles aligned in rows; these robots are each provided with at least one handling arm whose end is fitted with a gripping device, for instance with grippers or suction cups which must be suitably displaced or orientated in relation to the object to be handled, to make it possible to seize the object in its position on the corresponding stacking first receptacle, then to transfer it and to deposit it suitably on another receptacle in such a way that it constitutes thereon, a homogeneous layer, with other identical objects transferred earlier or later.

Taking into account the various positions and orientations of different objects of the same layer and/or the objects in different layers on a first receptacle, the proper functioning of such automatic transfer devices presupposes that the position of each object to be transferred can be precisely determined and transmitted to the control circuits of the automatic transfer device.

Moreover, it is known that the origin and the nature of widely distributed articles may be identified automatically by means of optical reader cells, by the reading of bar codes affixed to the articles or their packing. These bar codes are constituted by a given number of rectangular bars of equal length where the width of each bar is an integral multiple of that of a base standard; these bars which are of a black or dark colour are disposed side by side, spaced from and parallel to each other along their length, on a light background so that two neighbouring dark bars are always separated by a light gap. The bar codes thus constitute, on labels stuck on the articles or groups of articles or on the packing of the articles, a target mark for optical reading occupying a rectangular surface whose width corresponds to the common length of the bars and whose length, which is of a predetermined and constant value, corresponds to the sum of the widths of the various bars and of the gaps separating these bars. These bar codes are read by a laser beam which is emitted by an optical reader cell and is displaced transversely in relation to the length of the bars.

OBJECTS OF THE INVENTION

It is an object of the present invention to provide a simple and precise method for the detection of the position of identical parallelepiped-shaped objects stored on at least one first receptacle and intended to be transferred to at least one other receptacle by an automatic transfer device and the method in accordance with the invention should make it possible to make practical use of the positions detected by the control circuits of the automatic transfer device such as an automatic palletiser.

It is another object of the invention to provide a reliable device with a simplified structure intended to operate the method of the invention.

Another object of the invention is to provide a carrier having position markers which are particularly well-suited to the implementation of the method of the invention when it is used with the device according to the invention within a detection assembly.

SUMMARY OF THE INVENTION

For this purpose, a first aspect of the invention provides a position marker carrier for a parallelepiped-shaped object intended to be stored on a first receptacle and transferred by an automatic transfer device to another receptacle, characterised in that it comprises at least two adjacent flat label sections each of which is intended to be attached on one of two adjacent sides of the object, or to be integral with these two sides, and each of which label sections has a target mark for optical reading having a part with a predetermined length, said target mark being capable of being read by an optical reader beam emitted by a source to make it possible to determine the distance separating the source from the side of the object carrying the label section whose target mark is scanned by the beam.

Such a carrier is suitable when all the objects have a common orientation on the stacking receptacles, but since this is frequently not the case, the target mark advantageously has at least one identification mark on the side of the object whereon the respective label section must appear.

In a very simple and economic embodiment, the target mark has identification marks for the respective object in the form of an optically readable bar code, and the identification mark for the side comprises at least one additional bar, similar to and parallel to those of the bar code, and which is separated from the nearest bar of the bar code by a gap wider than that of any of the gaps separating two adjacent bars of the bar code, the two sides of the object whereon the two label sections must appear being identified by two different numbers of these additional bars.

In this case the bar code may constitute the part of a predetermined length of the target mark, this length being defined by the distance separating the two external edges of the two end bars of the bar code, but the predetermined length part of the target mark may also be defined by the bar code together with the additional bar or bars for identification of the side, this predetermined part then being defined by the spacing between the external edge of the end bar of the bar code on the end remote from the additional bar or bars, and the external edge of the additional bar which is furthest from the main field of the bar code.

A second aspect of the invention provides a method making it possible to detect the position of identical parallelepiped-shaped objects stored on at least one first receptacle and intended to be transferred by automatic transfer means, to at least one other receptacle, each such object having a position marker carrier with at least two flat adjacent label sections each provided with a target mark of a predetermined length for optical reading and each presented on one of two adjacent sides of the object whereof one side is a large side delimited by the length and height of the object and the other side is a small side delimited by the width and height of the object, and the objects having been stored on each pallet so that for each object a label section of the respective marker carrier is substantially parallel to a reference side of the receptacle supporting this object. The method is characterised in that, as far as each object is concerned, it involves scanning at least once the part of predetermined length of the target mark of the label section which is substantially parallel to the reference side of the receptacle with an optical reader beam emitted by a source and displaced at a constant speed, measuring the duration of the scanning of the part of predetermined length of the target mark and calculating the distance separating the source from the corresponding side of the object in dependence on (i) the predetermined length of the target mark, (ii) the constant speed of the scanning and (iii) the measured period, which allows the position of the objects to be deduced if they all have the same orientation.

On the other hand, if the objects do not all have the same orientation, the method moreover involves identifying the side of each object which is substantially parallel to the reference side of the respective receptacle by the optical reading of the target mark of the respective label section of the marker carrier of this object, so that the position of each object may be deduced from the identification of the corresponding side and the measurement of the distance separating it from the source.

The method also advantageously lies in using, as at least a part of the target mark of each label section of the marker carrier of an object, a bar code which can be optically read to allow the nature of the respective object to be identified by scanning the target mark along a substantially transverse direction in relation to the direction of the bars of the bar code, which has the advantage of economy to the extent that one can profit from the presence of an identification marking of the articles by bar codes by causing the article identification marking to fulfil an additional function to that for which this bar code conventionally appears on the objects without it being necessary to affix to the objects another data carrier such as a label with a section carrying the target marks for the optical reading necessary for the detection of the position of the objects.

In this case, the method lies moreover, in displacing the source of the optical reader beam in a direction whose projection on the side of the objects having a label section substantially parallel to the reference side of the corresponding receptacle is substantially parallel to the direction of the bars of the bar code of the target mark of this label section and to actuate an angular scan of the beam in a plane substantially perpendicular to this projection.

As far as each receptacle of the stored objects is concerned, the method in accordance with the invention advantageously lies in:

displacing first of all the source of the scanning beam opposite that of the sides of the objects of the top layer held by the receptacle which are substantially contained in the reference side of the receptacle, from one of the two end sides of the receptacle to the other, which end sides are perpendicular to the reference side, determining successively the position of the respective objects then, after the transfer of these latter by the automatic transfer means, displacing the source again in a similar manner opposite those of the now revealed sides of the remaining objects of the upper layer which are substantially parallel to the reference side of the receptacle and turned towards this reference side, determining successively the position of the respective remaining objects, then, after the transfer of these latter by the automatic transfer device, proceeding in a similar manner until the transfer of all the objects of the top layer is effected, then displacing the source towards the bottom of the receptacle by a level corresponding to the height of one layer of objects and resuming this cycle for the objects of the new top layer on the receptacle, and so on until the last layer of objects on the receptacle has been transferred.

Preferably, for each displacement of the source opposite the objects of the same layer on a receptacle, the method moreover lies in:

determining the position of the first object of this layer scanned by the beam after at least two successive and identical optical readings of the target mark of the label section of this first object, interrupting the scanning during a predetermined time interval corresponding to the time taken by the source for displacement by a threshold distance corresponding to the dimension of one label section of the marker carrier in the displacement direction of the source, reactuating the beam scanning until at least two successive and identical optical readings are obtained of the target mark of the label section opposite the second object of this layer, reinterrupting the scanning during the predetermined threshold time interval, and so on until the determination of the position of the last object scanned by the beam during this displacement of the source, thereby making it possible to distinguish the optical readings relating to adjacent objects and to limit the operation and hence the energy consumption and the ageing of the beam source very substantially whilst ensuring a good reliability of detection and adequate redundancy of the optical target mark readings.

The method for the position detection according to the invention simultaneously constitutes a particularly worthwhile method for actuating an automatic transfer device such as an automatic palletiser, if, moreover, it lies in:

memorising the positions successively determined in the course of each displacement of the source opposite objects of the same layer on a receptacle, then transferring the memorised positions to the automatic transfer means, and actuating the transfer of the respective objects by starting with that one, or those, whose side presenting the label section scanned by the beam during this displacement of the source is nearest to the source trajectory and by continuing the transfer of the objects with those whose side presenting the label section scanned by the beam is increasingly remote from the source trajectory.

A third aspect of the invention provides a device intended for operating the method of the second aspect, and comprising:

a scanning optical reader cell of the reflex type, provided with a laser beam source, a scanning device for the emitted beam with a constant angular velocity, and a receiver for the beam reflected by a reflecting target mark of each object whose position is to be determined, a counting device, started and stopped by the receiver during the passages of the emitted beam on the edges of a part of predetermined length of the target mark and measuring the scanning period of this part, a calculator for the distance separating the cell from the target mark in dependence on the angular scanning speed, the predetermined length of the scanned part on the target mark and the time taken to scan this part, a device for the longitudinal displacement of the cell opposite the objects of one layer on a receptacle and, a device for the step-wise vertical displacement of the cell opposite various layers on one receptacle.

This device, moreover, advantageously comprises:

a comparator memory for the comparison of successive optical readings of the same target mark, a calculator for the distance covered by the cell in longitudinal displacement, and a scanning switch actuating the interruption of scanning when the comparator memory has received at least two successive and identical optical readings of the same target mark and which actuates the recommencement of scanning when the calculator for the distance covered by the cell has calculated that the latter has been displaced by a given threshold distance during the preceding interruption of scanning.

To prevent the beam from scanning more than one target at one and the same time, the device does, moreover, comprise a mark limiting the effective scanning angle of the beam.

After each interruption of scanning, the activation of the cell is suitably ensured if the device also comprises a count controller switch actuated by the receiver of the cell and which places the counter device into its metering configuration when the receiver detects the arrival of the emitted beam on a detection marker carrier having at least one target mark for optical reading.

Finally, the invention provides in combination the apparatus according to the first aspect for detecting the position of identical parallelepiped objects stored on at least one first receptacle and intended to be transferred to at least one other receptacle by an automatic transfer means, and a set of detection marker carriers according to the third aspect.

BRIEF DESCRIPTION OF THE DRAWINGS

In order that the present invention may more readily be understood there will now be described, by way of illustrative example, an embodiment represented in the attached drawings, in which.

DESCRIPTION OF THE PREFERRED EMBODIMENT

Figure 1:
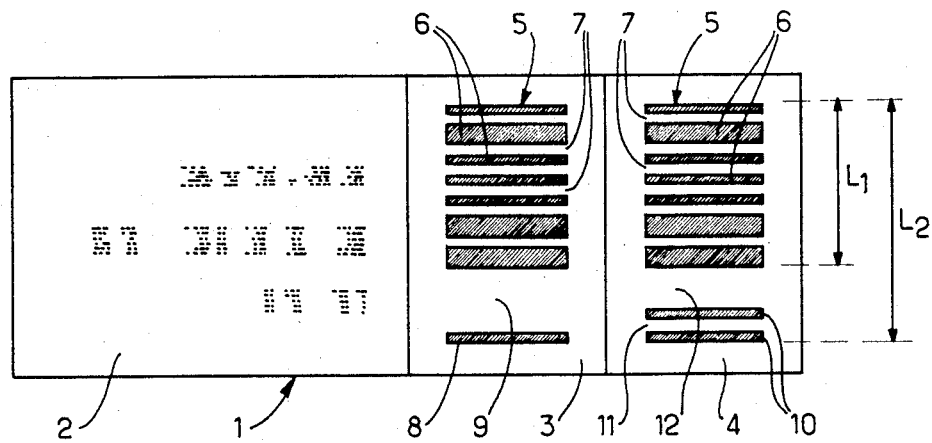
FIG. 1 is an elevational view of a position marker carrier in accordance with the invention.

Referring to FIG. 1, a position marker carrier takes the form of a self-adhesive rectangular label 1 divided into three rectangular adjacent parts whereof one part 2 bears alphanumerical data identifying the nature, capacity, the references etc. of the articles on which such a label is to be stuck.

The other two parts 3 and 4 of label 1 adjoin each other and have the same dimensions, and on each of these two parts there appears a bar code 5 of a well known type which identifies the origin and nature of the article to be marked, in accordance with all or part of the data which can be read on part 2 of the label 1. This bar code 5 is constituted by a succession of black or otherwise dark-coloured, rectangular, parallel and mutually spaced bars 6, all having the same length and each of which corresponds to the juxtaposition of a whole number of rectangular base standards of the same length and of unit width, so that the bars 6 have widths which are integral multiples of the unit width. Bars 6 are separated from each other by gaps 7 of a constant width and are on a light background corresponding to the light and very reflective surface of parts 3 and 4 of the label 1. The width of the bar code 5 corresponds to the common length of bars 6 whilst the length of the bar code 5 corresponds to the sum of the widths of all of the bars 6 and gaps 7. The bar codes 5 always have the same length and the same width even if they identify different articles.

In addition to bars 6 of bar code 5, the part 3 of label 1 has another bar 8 which is similar to bars 6 and parallel to them, but is separated from the nearest bar 6 by a light gap 9 of a width greater than that of any of the other gaps 7 separating bars 6, whilst part 4 of label 1 has two other bars 10 which are similar to bars 6 and 8, each have the same length as bar 8, are parallel to each other and to bars 6 of bar code 5, and are interspaced from each other by a gap 11 of the same width as that of gaps 7 separating the bars 6, the inner bar 10 (the one nearest to bar code 5) being separated from the nearest bar 6 by a gap 12 which, like gap 9, is of a greater width than that of each gap 7.

In this embodiment, not only is the length $L_1$ of bar codes 5 (that is to say, the distance separating the outer edges of two end bars 6) which is constant, but also the length $L_2$ corresponding to the distance separating the outer edge of the additional bar 8 or 10 which is furthest from the bar code 5, from the outer edge of the bar 6 furthest from the additional bar or bars 8 or 10, is constant.

On each part 3 and 4 of the label 1, the set of bars 6 of bar code 5 and the additional bar or bars 8 or 10 constitute a target mark for optical reading whose scanning along a transverse direction and preferably perpendicular to the length of bars 6, 8 and 10 by a laser beam emitted by an optical reader cell of the reflex type, makes it possible on the one hand to identify the article designated by bar code 5 and on the other hand, to identify whether it is the part 3 or part 4 which is scanned, by reason of the different numbers of the additional bars 8 or 10 shown by these parts 3 and 4.

Each target mark for optical reading thus comprises a part of predetermined length (considered in the direction of displacement of the reader beam) which is constant on the two parts 3 and 4 of a label 1 and from one label to another, and which is therefore either of length $L_1$ or of length $L_2$ in the example described, but which can only be the length $L_1$ if the total length $L_2$ varies from part 3 to part 4 of a label.

Figure 2:
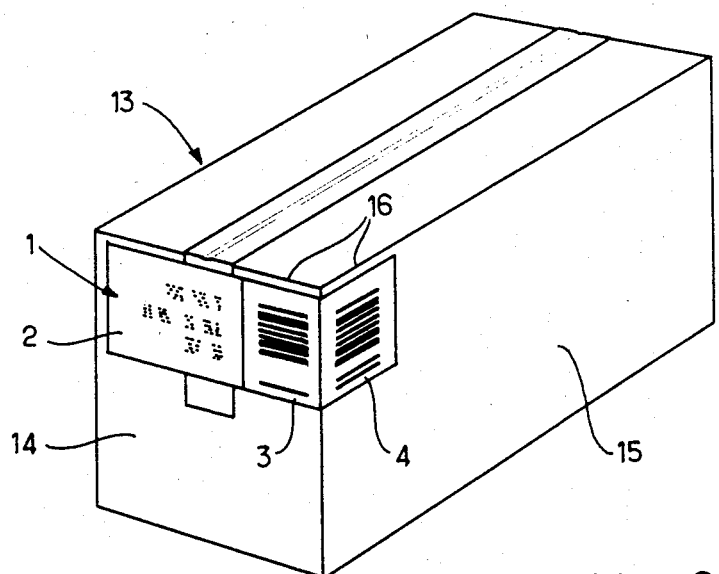
FIG. 2 is a view in perspective of a parallelepiped-shaped object having a position marker carrier of the type shown in FIG. 1.

In FIG. 2, a parallelepiped-shaped object such as a cardboard box 13 containing a certain number of articles, for instance, but not exclusively, shampoo bottles, shaving cream dispensers, or bottles of detergent carries a label 1 whose parts 2 and 3 constitute a label section stuck on a small side 14 of the box, delimited by its height and width and whose other part 4 constitutes a second label section stuck on the adjacent large side 15 delimited by the height and length of box 13 so that the line of separation between the two adjacent label sections 3 and 4 should be situated on the vertical edge common to sides 14 and 15.

Label 1 is stuck on box 13 near the upper edges 16 of the sides 14 and 15 of the box 13, and the distance separating the edges 16 from the lower edge of the label 1 is less than half the height of box 13.

On a label 1 thus stuck on a box 13, it will be seen that a bar code 5 of the target mark for optical reading of each label section 3 and 4 allows the box 13, and the articles it contains, to be identified whilst the additional bar or bars 8 and 10 of the target mark of each label section allow side 14 or 15 to which the corresponding label is stuck, to be identified.

Figure 3:
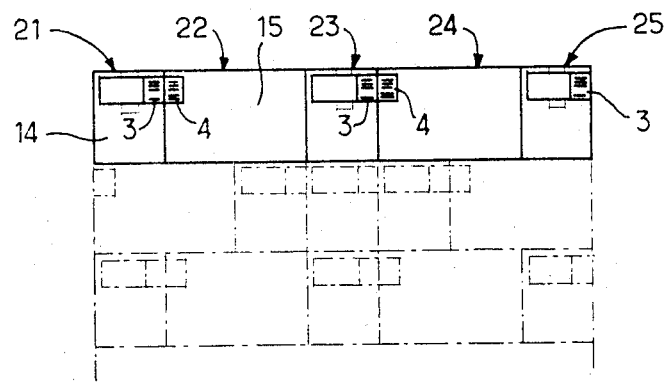
FIG. 3 is a front elevation of a stacking receptacle for objects such as the one in FIG. 2 whose top layer is shown in solid lines and the two lower layers are shown in dot dash lines.

The identical boxes 13 containing articles of a given type and carrying the corresponding labels, stuck in the same way to all the boxes 13, may be stored on homogeneous receptacles so that, for each box 13, one of the sides 14 and 15 is parallel to a reference side of the receptacle and is contained in this reference side, or turned towards it, as has been schematically shown in FIG. 3 for the upper three layers on a receptacle whose reference side is contained in the plane of this figure.

In the installations for the preparation of orders on the ground, several homogeneous receptacles having, for example, a length of 1.2 m and a width of 1 m and on each one of which there are stored identical boxes 13 but containing different articles from one receptacle to another, are aligned so that their reference side should be substantially in the same vertical plane and a cart carrying on the one hand, an empty receptacle, for example one of a different size (length 1.2 m and width 0.8 m) and on the other hand, an automatic palletiser provided with a handling arm, is displaced in front of the reference sides of the aligned storage receptacles and along these pallets in order to stack automatically and homogeneously layers of boxes coming from different storage receptacles so that the first layer should be formed by boxes containing, for instance, detergents, the second layer of boxes containing bottles of shampoo, the third layer of boxes containing shaving cream dispensers etc.

The cart is displaced longitudinally in front of the rows of stacking receptacles at a constant speed of, for instance, less than 1 m/s and so that the automatic palletiser can ensure the transfer of boxes 13; the cart also carries a device for the detection of the position of these boxes 13 on the stacking receptacles, the essential element of this device being laser beam optical reading cell of the type used for the reading of bar codes.

Figure 4:
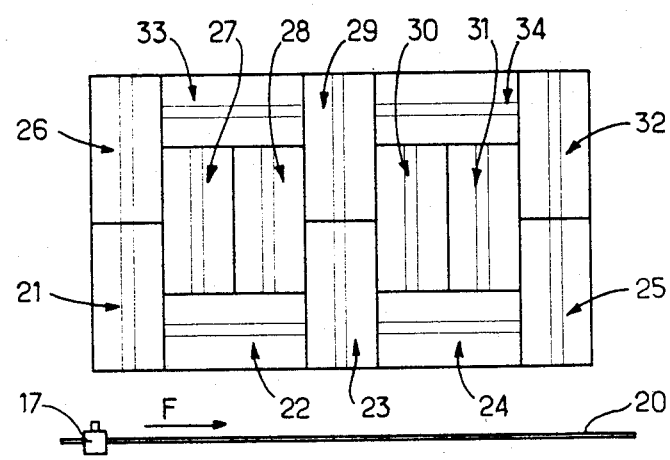
FIG. 4 is a plan view of the top layer of FIG. 3 and of the detection cell.
Figure 5:
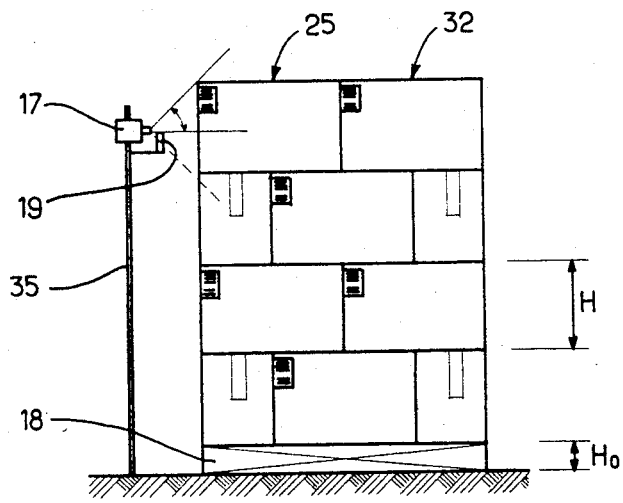
FIG. 5 is a side view of the receptacle of FIG. 3, and of the detection cell represented in schematic form.

This cell, represented as a whole at 17 in FIGS. 4 and 5, is of the reflex scanning type, that is to say, it comprises an emitter constituted by a laser beam source and an angular beam scanning device with a constant angular velocity and associated with a photo-receiver which is sensitive to the fraction of the emitted beam which is reflected by a target mark and which it receives. The scanning device is, for instance, constituted by a mirror oscillating at a constant frequency around a horizontal axis in order to reflect in a vertical plane, in the form of an alternating scanning beam, the incident laser beam which it receives from the source. It is also possible to use as scanning device a polygonal wheel with mirrors and caused to rotate at a constant speed around a horizontal axis which reflects the incident ray received from the source in the form of a unidirectional vertical scanning beam. One uses, for instance, a synchronous scanning cell ensuring 300 scans per second and provided with an optical window having a horizontal bisector and a scanning angle of 60°.

Cell 17 is on the one hand displaced horizontally with the cart by means of a longitudinal displacement mechanism and, on the other hand, displaced vertically on the cart by a step-wise vertical displacement mechanism whose step can be adjusted to the height of boxes 13 to be transferred.

When the beam emitted by such a cell 17 scans the optical reading target mark for the section of label 1 stuck to the small side 14 or the large facing side 15 of a box 13 in a vertically downward direction, then when the beam reaches the upper edge of this label section a change occurs in the intensity of the light signal received by the receiver of cell 17, taking into account the reflection coefficient of the surface of label 1. The receiver then actuates a counter control switch which places a counter device into its metering state. When the beam reaches the outer or upper edge of the upper bar 6 of the bar code 5, the counter device is triggered to start and it is subsequently stopped when the beam has scanned the known predetermined length, chosen as $L_1$ or $L_2$, on passing the lower edge of either the lower bar 6 of the bar code 5 or the additional lower bar 8 or 10. Then the counter control switch blocks the counter device when the beam crosses the lower end of label 1. In this way the counter device ensures, by comparison with the reference clock pulses, the measurement of the scanning time T of the part of predetermined length chosen as $L_1$ or $L_2$ of the target mark for optical reading, by a beam displaced with a constant angular velocity. An electronic calculator deduces therefrom the distance D separating the cell 17 from the side 14 or 15 bearing the label section whose optical target mark has been scanned, this distance D being inversely proportional to the measured time T.

One is thus effecting a telemetric measurement. Simultaneously, cell 17 reads the bar code 5 in order to ascertain the nature of boxes 13 whose position has been detected and to read the number of additional bars 8 or 10 whose scanning is announced by the scanning of the wide light gaps 9 or 12 which separate the additional bar(s) from the bar code 5. This makes it possible to identify which of the sides 14 or 15 faces cell 17.

The measurement of distance D, and the identification of the side of box 13 facing cell 17, allow the precise position occupied by box 13 to be deduced.

Tests have shown that distance D is measured with an accuracy of ±15 mm when D is from 0.4 m to 2 m. In the case where boxes 13 are not properly aligned in relation to the reference plane of the pallet, this fault of alignment may be measured with a view to a subsequent realignment, by the difference between the distances D measured at the two target mark edges considered in the horizontal displacement direction of the facing cell 17.

As shown in FIGS. 3 to 5, cell 17 is additionally brought, by the horizontal displacement mechanism, level with one end side of pallet 18 which is perpendicular to the reference side of the pallet and positioned by the vertical displacement mechanism at a height $$Z_i = (n-1) \times H + (H/2) + H_0,$$

where $H_0$ is the height of the pallet 18,

H is the height common to the boxes and hence the height of each one of the layers on first receptacle 18, and n is the number of layers of boxes on the first receptacle 18, so that the bisector of the scanning angle of 60° should be contained in the horizontal plane intersecting the boxes of the top layer at mid-height.

Then cell 17 is displaced longitudinally and horizontally opposite the boxes of the top layer, according to arrow F in FIG. 4, and the scanning is started by a scanning switch. To ensure that the beam cannot scan an optical reading mark of a box of the layer immediately below, a mark represented schematically by 19 in FIG. 5 limits the effective scanning to the upper half angle which is adequate for the complete scanning of the facing target mark of any of the boxes of the top layer.

As can be appreciated from FIGS. 3 and 4, during displacement of the cell 17 along the horizontal guide rail 20, the emitted beam first scans the target mark of the small side 14 of the first box 21 of the top layer. The position of this box 21 is determined when the device has effected three successive and identical readings of this target mark. Each reading, which consists of identifying the box 21 and its side 14 located opposite cell 17, and which allows distance D to be calculated, is placed in the memory of a comparator memory for successive optical readings. When three identical optical readings have been obtained, the scanning switch interrupts the scanning.

The position of box 21 is stored in a storage memory for the determined positions, whilst cell 17 pursues its horizontal displacement. On completion of the scanning, a device is triggered for measuring the distance covered by the cell 17 along rail 20. When the distance covered reaches a predetermined threshold value corresponding to the known and constant width of a target mark, this distance measuring device actuates the scanning switch to resume scanning. This makes it possible to ensure a distinction between two target marks which are very close to each other although carried by label sections stuck on two different boxes, as has been clearly shown in FIG. 3 where the second box 22 of the top layer is such that the target mark of its large side 15 is very close to the target mark of the small side 14 of box 21. Having determined the position of box 22 by three successive and identical optical readings of the target mark of its side 15, and after having memorised this position in the storage memory, the cell 17 then successively determines in an analogous manner the positions of the other facing boxes 23, 24 and 25 on the top layer and stops its horizontal displacement at the level of the other end side of first receptacle 18 whose dimensions are knwon to a central computer (for example, a microprocessor) which controls the progress of the operations.

The position of boxes 21 to 25 which appear in the storage memory are then transmitted to the control circuit of the automatic palletiser which successively transfers these boxes 21 to 25 to the second receptacle being displaced with the cart.

Then the cell 17 is returned to its initial position by horizontal transverse and resumes, in a similar manner, a cycle for determining the positions of the remaining boxes of the upper layer whose sides 14 or 15 are exposed to view by the cell 17 in the course of its displacement along rail 20.

This second displacement thus allows the positions of boxes 26 to 32 to be determined and memorised. These boxes are then transferred, starting with boxes 27, 28, 30 and 31 which are nearest the trajectory of cell 17, and finishing with boxes 26, 29 and 32.

During a third following cycle, cell 17 successively determines the positions of the two remaining boxes 33 and 34 of the top layer and then, after these have been transferred to the second receptacle, the cell 17 is returned into its initial position by the longitudinal displacement mechanism and then lowered along the vertical guide rail by the step-wise vertical displacement mechanism over a height H corresponding to the step of this mechanism so as to be opposite the boxes of the new top layer of the first receptacle and to make it possible to resume the cycle described above to ensure the transfer of these boxes.

These steps are repeated, layer by layer down the first receptacle 18, the movements of the automatic palletiser being restricted by the known dimensions of the first receptacles 18.

One may thus either unload a first receptacle 18, layer by layer, and then pass to the next first receptacle, or alternatively unload the top layers of several adjoined and aligned first receptacles 18 and then pass to the lower layers, depending on the orders to be prepared. The management of the installation as a whole will be ensured, for instance by a microprocessor which has been given the instructions relating to the orders to be prepared.

It shall be duly understood that the method and the device described above may give rise to any desirable modifications without thereby departing from the scope of the invention.

I claim:

1. In a method for detecting the position of identical parallelpiped-shaped objects and for transferring them by automatic transfer means from a first receptacle to at least one other receptacle, wherein each of the said objects carries a position marker carrier having at least two adjacent flat label sections, each of which label sections is provided with a target mark for optical reading, one part of the target mark having a predetermined length, and being displayed on a respective one of two adjacent sides of the object, one of the sides being a large side delimited by the length and height of the object and the other side being a small side delimited by the width and the height of the object, the objects having been stored on each first receptacle so that, as regards each one of them, one of the label sections of the corresponding marker carrier is substantially parallel to a reference side of the first receptacle on which this object is stored, the improvement wherein, for each said object the following steps are carried out:

(a) the said predetermined length part of the target mark of the label section which is substantially parallel to the reference side of the first receptacle is scanned at least once with an optical reading bean emitted by a light source and displaced at a constant speed, (b) the scanning time T of the predetermined length part is measured, and (c) the distance separating the light source from the respective side of the object is calculated from the predeterminted length, the constant scanning speed, and the measured time.

2. A method according to claim 1, and further including the step of identifying the side of each object which is substantially parallel to the reference side of the corresponding first receptacle by discriminating on the basis of the optical reading of the target mark of the corresponding label section of the marker carrier of this object.

3. A method according to claim 1, further comprising the step of using at least as a part of the target mark of each label section of the marker carrier of an object, a bar code which is optically read to allow the nature of the corresponding object to be identified, by scanning the target mark along a direction substantially transversely to the direction of the bars of the bar code.

4. A method according to claim 3, further comprising the steps of displacing the light source in a direction whose projection on the said respective side of the object which has the label section substantially parallel to the reference side of the corresponding first receptacle, is substantially parallel to the direction of the bars of the bar code of the target mark of this label section, and actuating an angular scanning of the beam in a plane substantially perpendicular to this projection.

5. A method according to claim 1, wherein for each first receptacle of stored objects the following further steps are carried out:

(d) first of all displacing the light source of the scanning beam opposite those of the sides of the objects of the top layer of the first receptacle which are substantially contained in the reference side of the first receptacle from end side to end side of this first receptacle which are perpendicular to the reference side, (e) one successively determining the position of the corresponding objects on the first receptacle;

(f) transferring said corresponding objects to said receptacle by use of the automatic transfer means;

(g) after such transfer, again displacing the light source in a similar manner opposite those of the now revealed sides of the remaining objects of the top layer which are substantially parallel to the reference side of first receptacle and are turned towards this reference side;

(h) successively determining the position of said now revealed remaining objects;

(i) after said now revealed remaining objects have been transferred by the automatic transfer device, repeating step (d) to (h) until all the objects of the top layer have been transferred; and (j) displacing the light source downwardly by a step corresponding to a height of one layer of the objects; and then (k) repeating steps (d) to (i) for the objects of the new top layer of the first receptacle; and continuing to repeat steps (j) and (k) until the last layer of objects of this first receptacle has been transferred.

6. A method according to claim 5, wherein for each displacement of the light source opposite the objects of the same layer of a first receptacle in steps (d) and (g), the following further steps are carried out:

(l) the position of the first object of the layer being scanned by the beam after at least two successive and identical readings of the target mark of the opposite label section on this first object is determined;

(m) the scanning is suspended during a predetermined time interval corresponding to the time taken by the source for the displacement through a distance corresponding to the dimensions of a label section of the marker carrier along the direction of the displacement of the light source;

(n) the scanning of the beam is resumed until at least two identical and successive optical readings of the target mark of the opposite label section on the second object of this layer have been obtained; and (o) the scanning is again suspended during light source advance for the said predetermined time interval; and (p) repeating steps (l) to (o) until the position of the last object of this layer scanned by the beam has been determined during this displacement of light source.

7. A method for the detection of the position of identical parallelepiped-shaped objects stored on at least one first receptacle according to claim 5, and for the actuation of an automatic transfer means for transferring these objects to at least one other receptacle, further comprising the steps of:

(q) memorising the positions successively determined in the course of each displacement of the light source opposite an object of any one layer of a first receptacle;

(r) transferring these memorised positions to the automatic transfer means; and (s) actuating the transfer of the corresponding objects starting with that at least one object whose side, which has its label section scanned by the beam in the course of this displacement of the light source, is nearest to the trajectory of the source; and (t) continuing the transfer of the objects by transferring those whose side having the label section scanned by the beam is increasingly remote from the trajectory of the light source.

8. Apparatus for the detection of the position of identical parallelepiped-shaped objects stored on at least a first receptacle and intended to be transferred to at least one other receptacle, comprising (a) automatic transfer means for transferring said objects from a said first receptacle to said at least one other receptacle;

(b) a reflex scanning type photocell for optically reading this reflecting target mark of a said label section;

(c) a laser beam source associated with said photocell;

(d) means for scanning the beam with a constant angular velocity to be reflected by said at least one reflecting target mark of each object;

(e) a counter;

(f) means for starting and stopping the counter in response to the emitted beam being scanned by the photocell passing the edges of a part of predetermined length of the target mark, whereby the counter measures the time of the scanning of this predetermined length part, (g) means for calculating the distance separating the cell from the target mark in dependence on the angular scanning speed, the predetermined length of the target mark part scanned, and the time of the scanning of this part, (h) means for displacing the photocell longitudinally opposite the objects of a layer of a said first receptacle; and (i) means for step-wise vertically displacing the photocell opposite various layers of a said first receptacle.

9. Apparatus according to claim 8, and further comprising:

(j) comparator memory means for comparing successive optical readings of the same said target mark;

(k) means for calculating the distance covered by the photocell in longitudinal displacement; and (l) scanning switch means effective to actuate the interruption of scanning when the comparator memory means has received at least two successive and identical optical readings of the same target mark and to actuate the resumption of scanning when the means for calculating the distance covered by the photocell has calculated that the displacement exceeds a given threshold distance from the location of the preceding interruption of the scanning.

10. Apparatus according to claim 8 and further comprising a mask which limits the effective scanning angle of the beam.

11. Apparatus according to claim 8, and further comprising counter control switch means actuated by the photocell, said counter control switch means being effective to place the counter into the metering configuration when the photocell detects the arrival of the emitted beam on a said detection marker carrier which has at least one said optical reading target mark.

12. A position marker carrier for a parallelepiped-shaped object intended to be stored on at least one first receptacle and to be transferred by an automatic transfer device to another receptacle, the said carrier comprising at least two flat adjacent label sections intended to be each associated with one of two adjacent sides of a said object and whereof each has an optically readable target mark having a part of predetermined length which part can be read by an optical reading beam to make it possible to determine a distance separating the source of the beam from a side of the object bearing the label section whose target mark is scanned by the beam.

13. A position marker carrier according to claim 12, wherein said at least two flat label sections are intended to be attached to said sides of the object.

14. A position marker carrier according to claim 12, wherein each of said flat adjacent label sections is integral with one of the two sides of the object.

15. A position marker carrier according to claim 12, wherein the target mark has at least one identification mark for the side of the object on which the corresponding label section is to appear.

16. A position marker carrier according to claim 12, wherein the target mark has identification marks for the corresponding object in the form of an optical readable bar code.

17. A position marker carrier according to claim 16, wherein the target mark has at least one identification mark for the side of the object on which the corresponding label section is to appear; and wherein the identification mark for the side of the object on which the label section is to appear comprises at least one additional bar similar to and parallel to those of the bar code and separated from the nearest bar of the bar code by a gap which is wider than any of the gaps separating two neighbouring bars of the bar code, the two sides of the object whereon the two label sections are to appear being identified by two different numbers of said additional bars on the respective label section.

18. A position marker carrier according to claim 16, wherein the bar code constitutes the said part of the target mark of predetermined length, this length being defined by the distance separating the two outer edges of the two end bars of the bar code.

19. A position marker carrier according to claim 17, wherein the part of the target mark of predetermined length is delimited by the bar code together with the at least one additional bar, this predetermined length being defined by the distance separating on the one hand the outer edge of that end bar of the bar code which is situated on the end remote from the additional bar or bars, and on the other hand the outer edge of the additional bar which is furthest from the bar code.

20. A combination comprising apparatus, according to claim 8, for the detection of the position of identical parallelepiped-shaped objects stored on at least one first receptacle to be transferred to at least one other receptacle by an automatic transfer device, and at least one set of detection marker carriers according to claim 12.

* * * * *